United States Patent [19]
Nicolas et al.

[11] 4,320,164
[45] Mar. 16, 1982

[54] MIRROR COMPOSITE ELEMENTS

[75] Inventors: Maurice Nicolas, Maurepas; Eugene Bacconnet, Marcoussis, both of France

[73] Assignees: Commissariat a l'Energie Atomique; Bfg Glassgroup, both of Paris, France

[21] Appl. No.: 176,566

[22] Filed: Aug. 8, 1980

Related U.S. Application Data

[62] Division of Ser. No. 956,043, Oct. 31, 1978, Pat. No. 4,241,126.

Foreign Application Priority Data

Nov. 17, 1977 [LU] Luxembourg ............................ 78535

[51] Int. Cl.³ .......................... B32B 3/30; B29C 5/00
[52] U.S. Cl. ..................... 428/167; 156/242; 264/279; 428/47; 428/174; 428/323; 428/325; 350/299; 52/247; 52/385
[58] Field of Search ................. 428/47, 143, 167, 174, 428/323, 325, 310 HL, 539, 913; 427/162; 156/63, 71, 242, 293, 297, 298, 300; 52/812; 350/293, 294, 299; 264/DIG. 31, 221, 274, 275, 279, 333; 126/417, 424, 438

[56] References Cited

U.S. PATENT DOCUMENTS

| | | | |
|---|---|---|---|
| 1,951,132 | 3/1934 | Cox | 156/297 |
| 3,509,010 | 4/1970 | Metzger | 428/213 |
| 3,521,418 | 7/1970 | Bartoloni | 156/297 |
| 3,959,056 | 5/1976 | Caplan | 156/197 |
| 4,038,971 | 8/1977 | Bezborodko | 350/299 |

FOREIGN PATENT DOCUMENTS

| | | |
|---|---|---|
| 1123774 | 9/1956 | France .................................. 428/143 |
| 340002 | 1/1931 | United Kingdom . |
| 415404 | 8/1934 | United Kingdom . |
| 497504 | 1/1939 | United Kingdom . |
| 677121 | 8/1952 | United Kingdom . |
| 1527814 | 10/1978 | United Kingdom . |

*Primary Examiner*—Paul J. Thibodeau
*Attorney, Agent, or Firm*—Cushman, Darby & Cushman

[57] ABSTRACT

A process for producing a composite element comprising a plurality of sheet members 64 rigidly secured to a support 65 with their rear main faces in contact therewith, characterized in that the sheet members, which have a perceptible reflectance, are placed on a jig 61 in one or more predetermined orientations relatively to one another, and a fluid, settable substance is applied to the thus arranged sheet members 64 e.g. by pouring from a ladle 66 and is caused or allowed to set at least partially while the sheet members 64 remain on the jig 61 to form at least part of a substantially rigid support structure 65 for the sheet members 64.

The invention includes a composite element which comprises a plurality of sheet members 64 having a perceptible reflectance, the sheet members 64 being rigidly secured with their rear main faces in contact with a surface of a substantially rigid support structure 65, the sheet members 64 also being arranged in one or more predetermined directions, the composite element comprising one or more members 69 secured to the rear main faces of the sheet members 64 and embedded as by casting in the support 65 to provide a key therefor.

14 Claims, 7 Drawing Figures

MIRROR COMPOSITE ELEMENTS

This is a division, of application Ser. No. 956,043 filed Oct. 31, 1978, now U.S. Pat. No. 4,241,126.

This invention relates to a process for producing a composite element comprising a plurality of sheet members rigidly secured to a support with their rear main faces in contact therewith, and to such composite elements.

A particularly difficulty arises when the sheet members secured to the support are each in the form of at least one sheet of a vitreous material or plastics and have a perceptible reflectance.

The term "sheet members having a perceptible reflectance" is used to denote light-reflectiing members, the reflected light being the majority of the light originating from the member and perceived by a human observer. Members of this kind include those having specular reflection. Non-limitative examples of members having a perceptible reflectance are sheets of glass coloured in the mass, vitreous or plastics sheets having coloured or reflecting coatings and polished metal sheets.

The coloured coatings can be organic, such as paints, or inorganic, such as vitrifiable enamels. The reflecting coatings can take the form of interference layers or metal layers.

Actual examples where the problem arises will now be described, of course without any idea of restricting the invention.

A facade element can take the form of a composite element having a support to which a number of flet sheets of coloured glass are secured. If the light is to be reflected uniformly by all the sheets forming the facade element, the major surfaces of the sheets must be coplanar. The various members must all reflect light in the same direction, otherwise the appearance of the facade will be marred. In the event, flat sheets of coloured glass secured to a support are in conditions such that the light perceived by an observer is basically the light reflected by the glass sheets.

A similar problem arises when the members are in the form of plane mirrors secured to a glass support to form internal building panels.

The same problem also arises with another kind of composite element which may be used in non-planar reflectors such as are used in solar energy collectors. The large reflecting surfaces, in the shape e.g. of a cylindrical paraboloid, are embodied by a large number of mirror members secured to a rigid support. The mirror members must be accurately arranged relatively to one another to achieve a high collection efficiency and/or high temperatures at the focal point or line of concentration.

Consequently, the securing of the mirror members to a support to form a composite element must be so devised that the reflection characteristics of the composite element comply with particular criteria or conditions which usually call for the observance of very close tolerances. Consequently, the light reflected by each individual mirror member of the composite element must be properly controlled to ensure that the light reflected by the composite element or, where applicable, by a number of complete composite elements meets the criteria.

This invention relates to a process for producing a composite element, the process facilitation complicance with predetermined criteria or conditions, more particularly as regards the observation of a very close tolerances.

According to the broadest aspect of the invention, there is provided a process for producing a composite element comprising a plurality of sheet members rigidly secured to a support with their rear main faces in contact therewith, characterised in that the sheet members, which have a perceptible reflectance, are placed on a jig in one or more predetermined orientations relatively to one another, and a fluid, settable substance is applied to the thus arranged sheet members and is caused or allowed to set at least partially while the sheet members remain on the jig to form at least part of a substantially rigid support structure for the sheet members.

The process according to the invention has the advantage of being relatively simple and economic to set up, yet of ensuring very considerable accuracy in the orientation of the sheet members relative to one another so as to meet reflection criteria satisfactorily, for composite elements having a planar surface and for composite elements having a non-planar surface.

As previously stated, the sheet members can take the form of glass sheets coloured in the mass. They can also take the form of glass sheets having a coloured coating. The coating can be an organic or an inorganic enamel.

The coating can also take the form of a thin layer or stack of thin layers acting as an interference filter. The coated sheet can be a vitreous or plastics substance. The materials used for the thin layers are, as a rule, oxides in known manner. As examples there may be mentioned the oxides of silicon, titanium, iron, cobalt, nickel, chromium and some mixtures thereof.

The coated member is usually connected to the support with the coating directed towards the support to give some protection of the or each coating.

The coated sheet can also be embodied by a metal or plastics sheet or foil or the like. The actual sheet members can take the form of metal or plastics panels or foils or sheets or the like.

Composite elements having sheet members of the kind hereinbefore outlined are of use mainly in buildings, either as part of an outside wall, more particularly the spandrels, or as part of an inside wall.

The process according to the invention has considerable advantages in the preparation of composite elements which include sheet members having high specular reflection, more particularly mirrors. It has been found that predetermined reflection characteristics and, more particularly, close tolerances in the relative positioning of the mirrors, can readily be achieved in this kind of composite element.

The mirror can comprise a glass or plastics or metal sheet as support for the reflecting covering or can be directly embodied by a metal sheet or panel.

Preferably each said sheet member comprises a vitreous sheet.

The mirror type of composite element is of use in building construction, usually for internal decorative walls.

However, another important use for a composite element of this kind is in the construction of reflectors or concentrators for collecting solar energy. The mirrors used for this purpose preferably take the form of a thin, e.g. at most 3 mm thick, glass sheet which has the reflecting coating. This usually takes the form of a layer of silver metal in known manner. However, other kinds of reflecting coating can be used, including reflecting mirrors embodied by stacks of thin layers and having selective reflection properties.

When the coating is directed towards the support, the use of a thin glass sheet provides the advantage that the amount of incident energy absorbed by the glass in the collection of solar energy is reduced, as are also double image formation effects. Also, the reduction in mirror weight makes it possible to reduce the size of the support and therefore the weight of the element.

Advantageously, the thickness of the thin sheet glass is less than 2 mm and even as little as 1 mm.

The individual sheet members can be plane or curved, the shape depending mainly upon the particular use for which the composite element is intended.

The support structure for the sheet members must be substantially rigid to ensure that, during the handling and positioning of the composite elements, the relative arrangement or orientation which the members were given during manufacture of the element does not alter. The arrangement and/or orientation of the members during manufacture is determined by a jig on which the sheet members are placed before being covered by the substance which will subsequently form the support structure.

The support structure can be devised from a resin in the form of a monomer or a prepolymer which is applied to the members while they are on the jig and which is left or caused to polymerise while the members remain on the jig.

Examples of resins of use for this purpose are phenol resins and polyurethanes, preferably in foam form.

The resins can be glass fibre reinforced to give the support the required rigidity without any excessive increase in its bulk.

The resins or the like can be applied to the members by techniques which are familiar in the plastics art.

Preferably, however, the substantially rigid support is formed by a mortar or a concrete being applied to the sheet members on the jig, the mortar or concrete drying while they remain on the jig. Mortar and concrete have particular advantages for the production of composite elements which will subsequently be placed in the open air, such as those which will be used as part of an outside wall of a building or as a solar energy concentrator.

As in the case of the resins or the like, the techniques used to prepare and cast the mortar or concrete are familiar in the respective arts. For intance, metal reinforcements can be placed in the concrete in known manner. The metal reinforcements can be connected to gripping means which are outside the resulting casting and which facilitate the handling of each element and its placing in the required position.

Concrete is usually prepared by "knocking-up" with water a mixture of a cement, a fine aggregate, as a rule, sand, and a coarse aggregate, in the form of gravel of varying sizes.

Advantageously, the concrete applied to the members on the jig has a coarse fraction in the form of beads of expanded products, such as expanded clays. It is preferred, however, to use expanded glass beads prepared from either natural or artificial glass. Preferably, the beads have a closed-pore structure so as to reduce the amount of water absorbed by the concrete.

The use of beads of expanded products helps to reduce the overall weight of the composite elements while ensuring that the support for the element is rigid enough.

Advantageously, the concrete has a fine fraction in the form of an expanded product which is also preferably in the form of expanded products in granular form such as expanded glass beads.

Concretes containing fine and coarse aggregates in the form of expanded grains or beads and well suited for the purpose of this invention include the concretes having the features described and claimed in published Patent Specification No. 2651 699 (Federal Republic of Germany), and it is considered that the latter features are covered by the present specification.

In a particularly preferrred embodiment of the invention, prior to the application of the substance in the fluid state, the rear main faces of the members are provided with one or more members secured thereto which provide a key for the settable fluid.

This improves the bond between the sheet members and the support structure.

The reflection properties produced in the element can therefore be maintained in the course of time. This is a very considerable advantage for composite elements which comprise mirrors and which will be used for solar energy concentrators. For instance, cylindrical segmented-mirror concentrators use thin mirrors in the form of elongated strips. It has been found that using such key members in such a concentrator enables the mirrors to be arranged relatively to one another within the required tolerances of e.g. a few minutes of an angle in mirror orientation and of ensuring that these parameters do not alter in the course of time. Clearly, the use of key members can provide similar advantages for other kinds of concentrator and other kinds of composite element, for example those to be used on facades of buildings.

The advantage of applying the key members to the sheet members of the element over using key members integral with such sheet members is that the sheet members can have optimum optical or reflecting properties, so that a high-quality product can be produced.

Such key members can be of a variety of kinds and shapes and can be made of metal or plastics.

Advantageously, the key members take the form of beads of an expanded product such as expanded glass. Key members of this kind are satisfactorily compatible with the various materials particularly envisaged for the support. Similar considerations apply to plastics. The use of expanded glass beads for the key members is very advantageous when a mortar or a concrete is used.

The key members can be secured to the members by any appropriate means.

Preferably, however, the or each key member is secured to a said sheet member by means of an adhesive based, e.g. on organic substances. The usual requirement in this connection is for materials having elasticity and/or plasticity; this is useful if the material used for the support shrinks during drying or hardening, inter alia while the members are still on the jig. This is a particularly important factor when the support material is a mortar or a concrete.

This advantage is exploited in a preferred form of the invention in that the rear main faces of the sheet members are coated with a fluid layer of a settable plastics material, the key members are placed on the rear faces of the sheet members in the fluid plastics layer before setting thereof, and the fluid, support-forming substance is applied after at least some drying or hardening of the plastics material.

The plastics layer can be a few millimeters thick. However, it is as thin as possible to the extent compatible with good securing of the key members.

Preferably, after placement of said sheet members on the jig, they are positively held in position during application of said fluid, settable substance. This prevents accidental dislodgement of the prepositioned sheet members during pouring of the support, and is especially important where the support comprises a concrete having a particularly coarse fraction e.g. of gravel. Such positive holding can be done in many ways. For example the jig can be constructed as an air box having holes in its sheet member receiving face so that such sheet members are held in place by suction. The sheet members may be held down by tensioned threads or a tensioned net laid across them. Such threads or net may for example be of nylon, and remain in the composite element during its life. Alternatively, weights may be laid upon the sheet members to hold them in position. In a particularly interesting embodiment in which a cylindrical parabolic mirror is made using elongate strip sheet members, shaped ribs of concrete are laid transversely across the mirror strips to hold them in place while concrete is poured over the ribs and strips to form the support. Yet another way of positively holding the sheet members in position on the jig is to provide the surface of the jig with edge stops for the sheet members.

Advantageously, said sheet members are in the form of laminates. The precise advantage conferred by this feature depends on the construction of the laminate and its support. For example, where the laminate is a mirror having a reflecting coating on one of its internal sheet faces, the reflecting coating is protected from corrosion. This is particularly important where the mirror is to be used outside or where the support is of mortar. Thin sheets, e.g. coloured sheets or sheets having special surface properties can also be incorporated into such laminate to increase their resistance to breakage or tearing prior to manufacture of the composite element.

In some preferred embodiments of the invention, said fluid, settable substance is applied to the sheet members to form spaced ribs of a said support structure. Such ribs can then form part of a framework rigidly supporting the sheet members.

Preferably said fluid, settable substance is applied to cover the whole area of the rear faces of the sheet members. This can provide a support structure which of itself is rigid. If desired such a support structure may incorporate integrally moulded ribs.

This invention includes a composite element produced by the process defined above.

The invention also includes any composite elements comprising a plurality of sheet members having a perceptible reflectance, the sheet members being ridigly secured with their rear main faces in contact with a surface of a substantially rigid support structure, the sheet members also being arranged in one or more predetermined directions, the composite element comprising one or more members secured to the rear main faces of the sheet members and embedded as by casting in the support to provide a key therefor.

A composite element of this kind can be used with advantage whenever the light-reflecting properties have to meet accurate criteria and/or conditions, as previously stated.

The sheet members and the substrate or support which make up the composite element may be any of those hereinbefore referred to.

More particularly, the sheet members preferably comprise mirrors, and advantageously, each said sheet member comprises a vitreous sheet.

Advantageously, the mirrors take the form of a thin, e.g. at most 2 mm thick, glass sheet which has a reflecting covering, as hereinbefore described.

The support can be made of the various materials hereinbefore considered. Preferably, however, the support is made of a mortar or a concrete.

A concrete, if used, has with advantage a coarse fraction consisting of an expanded product in granular form, preferably expanded glass beads.

Advantageously too, the concrete has a fine fraction which comprises an expanded product in granular form, preferably again expanded glass beads.

The use of one and/or the other of the two latter features leads to concretes which combine satisfactory mechanical strength with low density. For best results the two features should be used together.

The key members can consist of a variety of materials and have a variety of shapes. Preferably, the key members consist of an expanded product in granular form, advantageously expanded glass beads, with the advantages previously mentioned.

Advantageously, the key members are secured to the members by an adhesive.

Preferably, the rear main face of at least one said sheet member is formed by a layer of plastics adhesive material in which the key member is partially embedded. The materials used and the resulting advantages have been hereinbefore described.

The composite elements hereinbefore described can be used with advantage in the construction of the outside and inside walls of buildings. In outside walls the composite elements are particularly useful as spandrels, although this use is not limitative. Their usual function internally will be for decorative walls. In both cases the walls may be built up by the juxtaposition of a number of composite elements according to the invention.

The composite elements according to the invention are particularly useful in the collection of solar energy. The elements may be used in the construction of the large concentrators required for this kind of installation. In this case too the concentrator may be built up by the juxtaposition of composite elements according to the invention. The sheet members of the element will in the latter case be mirrors.

The concentrators used for this purpose may have reflecting surfaces of different shapes, such as spherical or parabolic or cylindrical or plane. The composite elements according to the invention can be used to construct concentrators of these different kinds. The elements according to the invention are particularly useful for cylindrical segmented-mirror concentrators using plane mirror strips at appropriate orientations to the cylindrical surface of the support.

Preferred embodiments of the invention will now be described with reference to the accompanying diagrammatic drawings in which.

EXAMPLE 1

Figure 1:
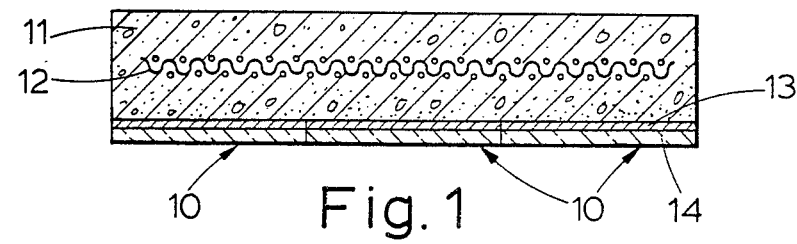
FIG. 1 is a diagrammatic view of a composite element according to the invention.

FIG. 1 shows a composite element according to the invention and comprising enamelled glass panels or plates or the like constituting sheet members 10 whose average dimensions are 70 cm × 100 cm and which are placed in side-by-side relationship. An ordinary concrete 11 with a metal reinforcement 12 serves as support for the enamelled glass panels or the like 10.

The enamelled glass is in known manner embodied by an inorganic enamel 13 deposited on a glass sheet 14 which has preferably been tempered to obviate any risk of breakage caused by heat absorbed by radiation.

This structure can be used as a spandrel in the outer walls of buildings or as an internal separating element or partition inside buildings.

The object of this structure is to produce sheet members which are sufficiently nearly coplanar when assembled one beside another to ensure that there is no impairment of the appearance of the resulting panels and that there is substantially no unpleasant distortion of the view which an observer in front of such an assembly has of the image.

To produce a structure of the kind shown in FIG. 1, the enamelled glass sheet members 10 are placed on a strong flat base in the form of a jig (not shown). The enamelled surface faces upwards and so does not contact the jig. Metal formwork (not shown) is then placed around the sheet members 10. An ordinary concrete 11 is poured, with reinforcement by reinforcing bars or the like 12, the concrete is allowed to set and when it is dry the framework is struck to remove the finished composite element. Means for gripping the element may be secured to the reinforcement of the concrete. The gripping means are not shown and enable the element thus formed to be handled and positioned.

As a variant, the enamel 13 covering the rear main face of the glass sheets 14 can be replaced by a thin layer of silicon oxide, $SiO_2$, which is deposited on the glass and covered by a layer of titanium dioxide, $TiO_2$, used in heat-reflecting glass panels with a high coefficient of reflection.

The latter kind of composite element is recommended for spandrel use in order not to impair the appearance of buildings which already have window glazing with finishes of this kind, so that the complete system of facade dealt with in this way looks the same colour in reflection.

As another variant, glass plates or panels coloured in the mass can be used instead of the glass members coated with enamel or covered by oxide coatings.

Clearly, the aesthetic consideration behind these variants also takes account of ensuring that the viewer in front of such a system has a clear undistorted view.

EXAMPLE 2

Figure 2:
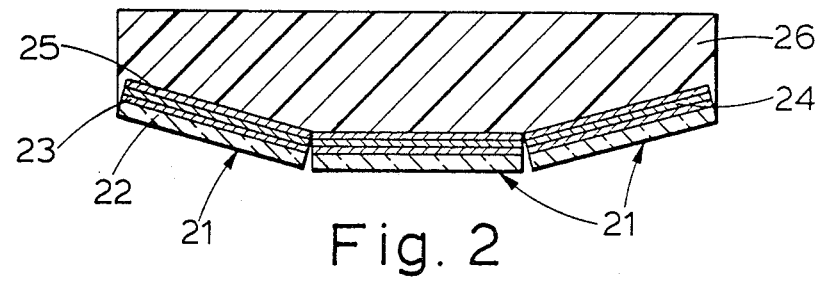
FIGS. 2 and 3 show a second embodiment of the invention.

Another embodiment of the invention, shown in FIG. 2, consists of producing a "triptych" mirror—i.e., a mirror having three major surfaces or facets—so devised that radiation incident on the mirror is reflected divergently after the fashion of a convex mirror. So that the construction may be readily understood, the contact angle between the discrete facets of the mirror is shown exaggerated.

Each discrete sheet member 21 of the complete mirror consists of a glass plate 22 with a silver coating 23 in turn covered by a copper coating 24, the whole being protected by a layer of varnish 25. The sheet members 21 are carried by a substantially rigid support 26 made of a resin consisting mainly of foam polyurethane.

As a variant, the support for the silvering can be not a glass plate or panel but a hard plastics sheet of the same size, for example of polycarbonate or methylmethacrylate, which is silver-coated by conventional processes. As another variant, the sheet member 21 can be replaced by sheets of polished metal, such as bright aluminium.

To ensure the required reflection and obviate distortion, the items which make up a convex mirror of this kind must always be properly oriented.

Figure 3:
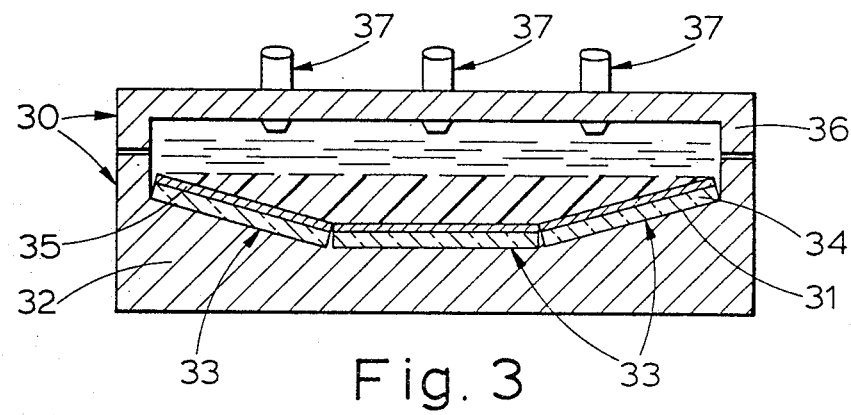

FIG. 3 illustrates the production of the composite element just described. Internal surface 31 of bottom part 32 of a mould 30 has three planes or facets 33 whose contact angle is exaggerated for the sake of a better understanding of the drawing and which are oriented to form a jig of complementary shape in relation to the shape of the required composite mirror element. Three glass mirrors 34, whose silver, copper and varnish layers are indicated diagrammatically as a single layer 35, are placed on the surfaces 33. A cover 36 is placed on the mould or jig 30; the cover 30 is formed with a number of orifices 37 for the injection of a resin—by way of example, polyurethane—in the liquid state.

The mould is heated, then cooled, by elements (not shown) to polymerize the resin so that the same becomes hard and compact and can serve as a support for the complete mirror. The article is released from the mould after cooling. The resin is shown in its two states in FIG. 3—in the liquid state near the injection orifices 37 and in the polymerized state adjacent the mirrors.

In a variant of this Example, the mould bottom part 32 comprises a chamber (not shown) in communication with holes formed in the three facets 33 of the mould surface 31 and with a vacuum pump. When the vacuum pump (not shown) is switched on, the suction created serves to anchor the three mirrors 34 in position in the mould during formation of the support.

EXAMPLE 3

Another embodiment of the invention will now be described with reference to FIGS. 4 to 6.

Figure 4:
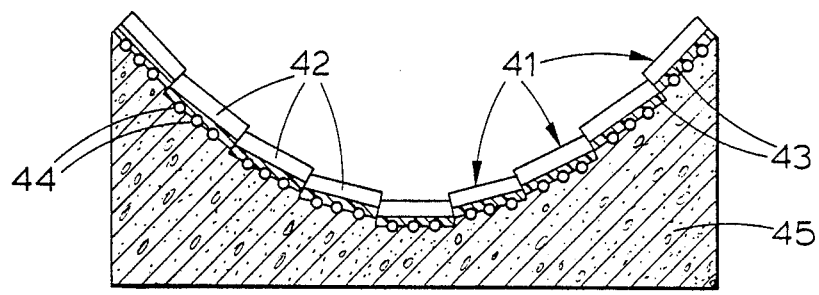
FIG. 4 shows a third embodiment of the invention.

FIG. 4 is a view in cross-section of a composite element serving as a cylindrical segmented-mirror reflector as used as an energy concentrator in solar boilers.

The concentrator consists of a large number of sheet members 41 in the form of side-by-side strips and appropriately oriented along the generatrices of a cylindrical support. The strips are offset from one another to form the segmented composite mirror. The strips must be positioned very accurately in relation to one another, For instance, each strip must be oriented at a closely defined angle with a tolerance of something like 10 minutes of angle.

Each strip comprises a glass member 42 having, in addition to the conventional covering of silver, copper and varnish layers (not shown), an adhesive layer 43 in which expanded glass beads 44 are embedded; the beads 44, which are at least 15 mm in diameter, act as keys to secure the 4–5 cm wide strips over a length of approximately 100 cm in concrete 45 which serves as the support for all the mirrors 41.

As a variant, each strip can take the form of a bright metal sheet 2 mm or less in thickness.

The adhesive used here is RTV 589 silicone resin; however, any resin or adhesive giving a good bond with the substrate and the beads 44 can be used. The use of bituminous adhesives for example serves to exclude atmospheric moisture from the reflective coatings on the mirror and thus affords protection against corrosion.

Figure 5:
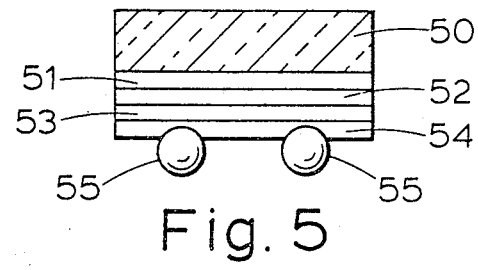
FIG. 5 shows a sheet member for assembly into the composite element of FIG. 4 in greater detail.
Figure 6:
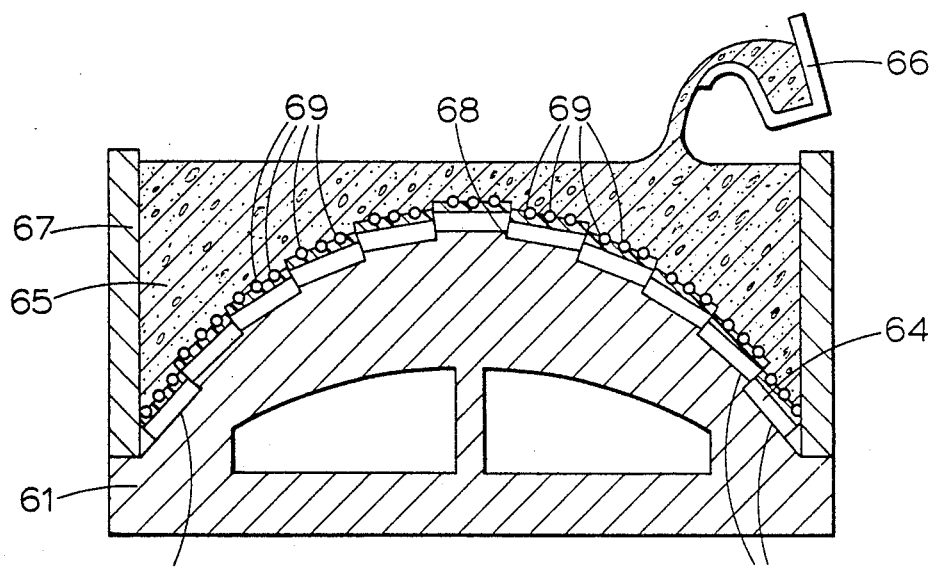
FIG. 6 is a diagrammatic view showing how a composite element according to FIG. 4 can be manufactured.

FIG. 5, which is to an enlarged scale, shows a sheet member for attachment to a support, the sheet member comprising a glass strip 5 coated with a silver layer 51, a copper layer 52 and a varnish layer 53. The resulting mirror is coated with a layer of adhesive 54 in which one or more expanded glass beads 55 are embedded to serve as key members for the support. The exposed part of the beads 55 will be embedded in the concrete or other fluid settable substance which will subsequently be poured over the strip.

The mirror strips are simply coated with an adhesive layer 54 as shown in FIG. 5, and the expanded glass beads are pressed into it. Drying proceeds until the beads are well bonded to the strips. Strips such as that illustrated in FIG. 5 may be assembled as shown in FIG. 6 to form a composite element according to the invention. In FIG. 6, each strip 64 is placed on a metal jig 61 having a former or matrix 62 formed with steps 63. Cellular concrete 65 is poured into a mould 67 placed on the jig from a pourer or ladle or the like 66 shown in very diagrammatic form. The concrete is allowed to set, and when it has hardened the article is removed from the mould.

The strips are keyed to the concrete by means of expanded glass beads 69. The concrete used can have the following composition:

| expanded glass beads | |
|---|---|
| Fine fraction from 0 to 3 mm | 450 liters |
| Coarse fraction from 8 to 16 mm | 800 liters |
| water | |
| practical amount | |
| (water/cement ratio: 0.45) | 157 liters |
| 400 artificial Portland cement | 350 kilograms |

This concrete has the following properties:

| Dry density after 28 days | 680 kg/m³ |
|---|---|
| Compression resistance (Crushing strength) after 28 days | 72 kg/cm² |
| Compatibility with cement tested according to ASTM C227.72 | excellent |

As in the embodiment shown in FIG. 4, the strips must be arranged very accurately in relation to one another. By way of example, in some circumstances each of the strips must be oriented at an angle correct to 10 minutes.

As a variant, ordinary concrete (foamed or not) can be used instead of cellular concrete and, as previously stated in Example 1, any type of concrete can have some form of metal reinforcing (not shown in FIG. 6) to which external gripping means (not shown) such as fixing brackets are secured to facilitate the handling and positioning of the composite elements of the structure described.

As another variant, the glass strips can be replaced by polished metal sheets.

In other variants of this Example, the glass strips 64 are held in place on the jig 61 during pouring of the concrete.

In a first such variant, this is done by laying a nylon net over the strips 64 prior to positioning of the mould walls 67. The net is held in tension, thus holding the strips in place, by the weight of the mould walls.

In a second such variant, pre-cast ribs of concrete, for example of the same composition as that used to form the support, are laid across the strips 64 in planes parallel to the plane of the drawing.

In a third such variant, strips of thin metal are secured to the risers 68 between the strips 63 on the jig surface 62 so as to retain the strips 64 against sliding.

In a fourth such variant, the strips 64 are held in place by suction as described with reference to FIG. 3.

EXAMPLE 4

Figure 7:
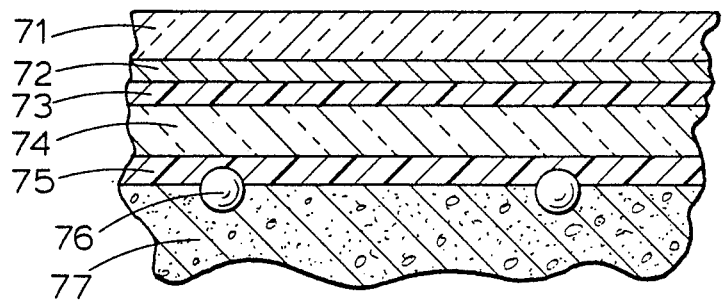
FIG. 7 is a detail cross-sectional view of yet another embodiment of the invention.

FIG. 7 is a detail cross-sectional view showing part of an embodiment of composite element according to the invention. In FIG. 7, a sheet member comprises a first glass sheet 71 of thin glass, e.g. 1 mm thick which bears coatings of silver, copper and varnish all shown together as the layer 72. This sheet 71 is laminated, using a plastics adhesive material 73 to a second glass sheet 74. The second glass sheet 74 and the plastics interlayer 73 serve to protect the layer 72 against abrasion and corrosion, and also give added strength. It will be appreciated that for use as a solar collector, the glass sheet 71 should be as thin as possible so that it will absorb little radiation. On the other hand, the handling of strips of glass 1 mm thick, 5 cm wide and say 1 meter long such as may be used to make cylindrical composite mirrors can present problems because of their fragility.

The rear face of the second glass sheet 74 is coated with an adhesive 75, such as RTV 589 silicone resin, and expanded glass beads 76 are pressed into this adhesive so that they are partly embedded and serve as keys for a concrete support 77.

The support 77 may be formed as described with reference to FIG. 6.

In a variant for forming the support 77, concrete such as 65 (FIG. 6) is poured between shutters to form spaced ribs extending in planes parallel to the plane of the Figure. A metal framework e.g. of steel bars is positioned prior to pouring of the concrete so that it is cast into the ribs when they set so as to form a substantially rigid support for the strips 64 (FIG. 6).

In yet another variant, mould elements not shown are lowered between the mould walls 67 (FIG. 6) so that they are spaced from the strips 64 to define voids so that when the concrete is set the support is formed by a continuous base to which the strips are secured and which has upstanding therefrom a plurality of integral bracing ribs.

An alternative composition of concrete which may be used in embodiments of the invention has the following composition:

| Coarse fraction: | expanded glass beads | 3–8mm | 1 m³ |
|---|---|---|---|
| Fine fraction: | sand | 0.1–0.6mm | 400 kg |
| | | 0.6–1.25mm | 200 kg |
| | Water | | 200 liter |
| | Cement | | 350–400 kg |

We claim:

1. A composite mirror comprising a plurality of mirror sheet members rigidly secured with their rear main faces in contact with a surface of a concrete rigid support structure, the mirror sheet members being arranged in faceted manner to face in a plurality of predetermined directions, and comprising one or more members secured to the rear main faces of the mirror sheet members and embedded in the support structure to provide a key therefor.

2. A composite element according to claim 1, characterised in that each said sheet member comprises a vitreous sheet.

3. A composite element according to claim 1, characterised in that the mirror is embodied by a thin, at most 2 mm thick, glass sheet having a reflecting covering.

4. A composite element according to claim 1, characterised in that the concrete has a coarse fraction comprising expanded glass beads.

5. A composite element according to claim 4, characterised in that the concrete has a fine fraction comprising expanded glass beads.

6. A composite element according to claim 1, characterised in that the key members consist of an expanded product in granular form.

7. A composite element according to claim 1, characterised in that the key members are adhesively secured to the sheet members.

8. A composite element according to claim 7, characterised in that the rear main face of at least one said sheet member is formed by a layer of plastics adhesive material in which the key member is partially embedded.

9. A composite element according to claim 1, characterised in that at least some of said sheet members are constructed as laminates.

10. A composite element according to claim 1, characterised in that said support structure includes a plurality of spaced ribs cast in situ on the sheet members.

11. A composite element according to claim 1, characterised in that said support structure covers the whole area of the rear main faces of the sheet members.

12. A composite element according to claim 1, characterised in that it forms a part of a building wall.

13. A composite element according to claim 1, characterised in that it forms a part of a solar energy concentrator.

14. A composite element according to claim 13, characterised in that it forms part of a cylindrical segmented-mirror concentrator.

* * * * *